United States Patent
Jouard et al.

(10) Patent No.: US 11,752,712 B2
(45) Date of Patent: Sep. 12, 2023

(54) HOLDING SYSTEM FOR SUPPORTING A WAFER AND AN OPTICAL ELEMENT CONFORMED SO AS TO FORM AN OPTICAL SYSTEM AND A METHOD FOR FORMING SUCH OPTICAL SYSTEM

(71) Applicant: Essilor International, Charenton-le-Pont (FR)

(72) Inventors: Ludovic Jouard, Charenton-le-Pont (FR); Sira Uhalte Nogues, Charenton-le-Pont (FR); Mathieu Meynen, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 186 days.

(21) Appl. No.: 16/968,991

(22) PCT Filed: Feb. 13, 2019

(86) PCT No.: PCT/EP2019/053524
§ 371 (c)(1),
(2) Date: Aug. 11, 2020

(87) PCT Pub. No.: WO2019/158571
PCT Pub. Date: Aug. 22, 2019

(65) Prior Publication Data
US 2021/0023802 A1    Jan. 28, 2021

(30) Foreign Application Priority Data
Feb. 13, 2018 (EP) .................................. 18305147

(51) Int. Cl.
*B29D 11/00* (2006.01)
*G02F 1/29* (2006.01)
*G02C 7/08* (2006.01)

(52) U.S. Cl.
CPC .......... *B29D 11/00403* (2013.01); *G02F 1/29* (2013.01); *B29K 2995/0026* (2013.01); *G02C 7/083* (2013.01); *G02F 1/294* (2021.01)

(58) Field of Classification Search
None
See application file for complete search history.

(56) References Cited

U.S. PATENT DOCUMENTS 4,865,670 A   9/1989 Marks
5,286,421 A   2/1994 Arai
(Continued)

OTHER PUBLICATIONS

International Search Report for PCT/EP2019/053524 dated May 16, 2019, 6 pages.
(Continued)

*Primary Examiner* — Barbara J Musser
(74) *Attorney, Agent, or Firm* — NIXON & VANDERHYE (57) ABSTRACT

Disclosed is a holding system for supporting a wafer having a first surface, a second surface and a third surface joining the first and second surfaces, and an optical element having a first surface, a second surface and a third surface joining the first and second surfaces, the holding system including: a support including first support unit configured to support the second and/or third surface of the wafer and second support unit configured to support the second and/or third surface of the optical element; a positioning unit configured to position the second surface of the wafer relative to the first surface of the optical element; and a mechanical unit configured to move the first and second support units one relative to the other so as to move the second surface of the wafer and the first surface of the optical element to form an optical system.

16 Claims, 5 Drawing Sheets

(56) References Cited

U.S. PATENT DOCUMENTS

| | | | |
|---|---|---|---|
| 5,916,398 A | 6/1999 | Coleman et al. | |
| 8,136,566 B2 * | 3/2012 | Tahira | H01M 8/02 429/511 |
| 2002/0036056 A1 | 3/2002 | Shida et al. | |
| 2003/0017340 A1 | 1/2003 | Jiang et al. | |

OTHER PUBLICATIONS

Written Opinion of the ISA for PCT/EP2019/053524 dated May 16, 2019, 7 pages.

* cited by examiner

HOLDING SYSTEM FOR SUPPORTING A WAFER AND AN OPTICAL ELEMENT CONFORMED SO AS TO FORM AN OPTICAL SYSTEM AND A METHOD FOR FORMING SUCH OPTICAL SYSTEM

This application is the U.S. national phase of International Application No. PCT/EP2019/053524 filed Feb. 13, 2019 which designated the U.S. and claims priority to EP Patent Application No. 18305147.3 filed Feb. 13, 2018, the entire contents of each of which are hereby incorporated by reference.

FIELD OF THE INVENTION

The invention relates to a holding system for supporting a wafer and an optical element, the wafer and the optical element being conformed so as to form an optical system.

The invention further relates to a method for forming an optical system comprising a wafer and an optical element.

BACKGROUND OF THE INVENTION

An optical system is generally formed with a wafer glued on an optical element.

The wafer may comprise an upper surface having a prescription of a wearer and a lower surface, which is intended to be glued to the optical element.

When the optical element is a light-guide optical element, the prescription of the wearer may result from the radius of the rear face of the wafer when the wafer is worn by the wearer, because a light-guide optical element is a perfect plano-optical and plano-geometrical element. The optical element may further have a non-zero optical power. In this case, the radius of the rear face of the wafer when the wafer is worn by the wearer may compensate the non-zero optical power of the optical element.

When the optical element is a electro-chromic cell, the prescription of the wearer may result from both the upper and lower surfaces of the wafer. Usually, the devices configured to place the wafer on the optical element so as to form the optical system calculate the position of the wafer relative to the optical element based on a referential.

Such devices mainly use means for maintaining the wafer by vacuum or means for maintaining the upper surface of the wafer. However, the reference surface of the wafer is the lower surface, and the upper surface of the wafer has a complex geometry which is different from the geometry of the lower surface of the wafer. Moreover, since the upper surface of the wafer generally comprises the prescription of the wearer, by maintaining the upper surface of the wafer, for instance with a sucker, the prescription of the wearer may be damaged. More precisely, the glue arranged between the wafer and the optical element is intended to be polymerized. The polymerization of the glue when the wafer is constrained, for instance with a sucker, may cause optical deformation of the prescription of the wearer.

Furthermore, when the wafer is dropped off on the glue spread on the optical element, air bubbles are formed on the glue, and prism is introduced on the optical system.

Thus, there is a need for a device which allows controlling the drop off of the wafer on the glue spread on the optical element so as to prevent damages on the prescription of the wearer and avoid air bubbles and prism to be introduced on the optical system.

One object of the invention is to provide such device.

SUMMARY OF THE INVENTION

To this end, the invention proposes a holding system for supporting a wafer and an optical element, the wafer and the optical element being conformed so as to form an optical system, the wafer having a first surface adapted to the prescription of a wearer, a second surface opposed to the first surface and a third surface joining the first surface and the second surface, the optical element having a first surface, a second surface opposed to the first surface and a third surface joining the first surface and the second surface, the holding system comprising:
  support means comprising first support means configured to support at least part of the second surface and/or of the third surface of the wafer and second support means configured to support at least part of the second surface and/or of the third surface of the optical element,
  positioning means configured to position the second surface of the wafer relative to the first surface of the optical element, and
  mechanical means configured to move the first and second support means one relative to the other so as to move the second surface of the wafer and the first surface of the optical element to form the optical system.

Advantageously, having the wafer supported by its second surface and/or its third surface allows preserving its first surface adapted to the prescription of a wearer. Indeed, the first surface of the wafer is not deformed by the first support means, and thus the prescription of the wearer is not impacted by the first support means.

Advantageously, the holding system according to the invention allows avoiding air bubbles and prism to be formed in the optical system.

According to embodiments, the holding system according to the invention may further comprise one or several of the following features according to any possible combination:
  the support means are the positioning means; and/or
  the first support means comprise a least one blade configured to support at least part of the second surface and/or the third surface of the wafer; and/or
  the at least one blade is deformable so as to present a plurality of contact points with the second surface and/or with the third surface of the wafer; and/or
  the first support means comprise a plurality of blades, each blade being configured to support at least part of the second surface and/or of the third surface of the wafer; and/or
  the at least one or the plurality of blades is made of plastic material, or of metallic material, or of nylon; and/or
  the plurality of blades is configured to be regularly distributed on the periphery of the second surface of the wafer; and/or
  at least a part of the at least one blade is conformed to be removed from the first support means; and/or
  the at least one blade is conformed to be removed from the first support means; and/or
  the at least one or each blade of the plurality of blades is a retractable blade; and/or
  the at least one or the plurality of retractable blades is manually or automatically retractable; and/or
  the at least one or the plurality of retractable blades is configured to be retracted when the distance between the second surface of the wafer and the first surface of the optical element is equal to a predetermined distance; and/or
  the holding system comprising glue deposing means configured to drop off glue with a predetermined shape on the first surface of the optical element and/or on the second surface of the wafer; and/or
  the at least one or the plurality of retractable blades is configured to be retracted when the glue deposit spread on more than 50% of the first surface of the optical element and/or on more than 50% of the second surface of the wafer; and/or the thickness of the at least one or each retractable blade is smaller than or equal to the thickness of the glue deposit spread on more than 40% of the first surface of the optical element and/or on more than 40% of the second surface of the wafer; and/or the mechanical means are configured to move the first and second support means one relative to the other with a predetermined speed; and/or the predetermined speed is relative to a material composing the optical element and/or to a material composing the wafer and/or to a material composing the glue and/or to a surface treatment applied on the first surface of the optical element and/or to a surface treatment applied on the second surface of the wafer and/or to the shape of the wafer and/or to the type of the wafer and/or to the predetermined shape of the glue deposit on the first surface of the optical element and/or to the predetermined shape of the glue deposit on the second surface of the wafer and/or to the spread of the glue deposit on the first surface of the optical element and/or to the spread of the glue deposit on the second surface of the wafer; and/or the mechanical means comprise translation means and/or rotation means; and/or the first support means are moved in the direction of the second support means; and/or the mechanical means are manually or automatically controlled; and/or the mechanical means are configured to move the first and second support means one relative to the other so that the distance between the second surface of the wafer and the second surface of the optical element varies constantly; and/or the optical element being a light-guide optical element, the second surface of the wafer and the second surface of the optical element are plane surfaces, and the mechanical means are configured to move the first and second support means one relative to the other so that the second surface of the wafer and the second surface of the optical element move in parallel one to the other; and/or the holding system further comprising a real-time measuring device configured to measure in real-time the distance between the second surface of the wafer and the second surface of the optical element, and wherein the mechanical means are configured to move each blade of the plurality of blades independently one from the other based on the measurement of the real-time measuring device; and/or the optical element being a light-guide optical element, the second surface of the wafer and the second surface of the optical element are plane surfaces, and the real-time measuring device is configured to measure in real-time the parallelism between the second surface of the wafer and the second surface of the optical element; and/or the holding system comprising a polymerizing device configured to polymerize the glue deposit spread at least on the first surface of the optical element and/or on the second surface of the wafer.

Advantageously, having the second surface of the wafer and the second surface of the optical element moving in parallel one to the other with a low predetermined speed allows avoiding air bubbles in the glue deposit between the first surface of the optical element and the second surface of the wafer when the optical system is formed and prism to be formed in the optical system.

The invention further relates to a method for forming an optical system comprising:

a holding system providing step, during which a holding system according to the invention is provided, an optical element providing step, during which an optical element having a first surface, a second surface opposed to the first surface and a third surface joining the first surface and the second surface is provided, a wafer providing step, during which a wafer having a first surface adapted to the prescription of a wearer, a second surface opposed to the first surface and a third surface joining the first surface and the second surface is provided, an optical system positioning step, during which the second surface and/or the third surface of the optical system is positioned on the second support means of the holding system, a wafer positioning step, during which the second surface and/or the third surface of the wafer is positioned on the first support means of the holding system, and a moving step, during which the first and second support means are moving one relative to the other so as to move the second surface of the wafer and the first surface of the optical element to form the optical system.

Advantageously, having the wafer supported by its second surface and/or its third surface allows preserving its first surface adapted to the prescription of a wearer. Furthermore, the method for forming an optical system according to the invention allows avoiding air bubbles and prism to be formed in the optical system.

According to embodiments, the method for forming an optical system according to the invention may further comprise one or several of the following features according to any possible combination:

the optical element is a light-guide optical element, or an electro-chromic cell, or a liquid crystal display cell; and/or during the optical system positioning step, the second surface of the optical element is positioned on the second support means according to a reference system, and during the wafer positioning step, the first surface of the wafer is positioned on the first support means according to the second surface of the optical element; and/or the first support means comprising at least one retractable blade configured to support at least part of the second surface and/or third surface of the wafer, and the method further comprises a blade retracting step, during which the at least one retractable blade is retracted; and/or the first support means comprising at least one blade configured to support at least part of the second surface and/or third surface of the wafer, and the method further comprises a blade removing step, during which at least a part of the at least one blade is removed from the first support means; and/or during the blade removing step, the at least one part of the at least one blade is cut from the first support means; and/or the at least one blade being removable, and wherein during the blade removing step, the at least one blade is removed from the first support means; and/or the optical system being intended to be integrated in a frame, and wherein the at least one part of the blade is arranged to be covered by the frame; and/or the method further comprises a glue deposing step, during which glue is dropped off on the first surface of the optical element and/or on the second surface of the wafer, and during the moving step, the second surface of the wafer and the first surface of the optical element are glued one with the other so as to form the optical system; and/or during the blade retracting step, the at least one retractable blade is retracted when the glue deposit spread on more than 50% of the first surface of the optical element and/or on more than 50% of the second surface of the wafer; and/or during the moving step, the distance between the second surface of the wafer and the second surface of the optical element varies constantly; and/or during the moving step, the second surface of the wafer and the first surface of the optical element move one relative to the other with a predetermined speed; and/or the optical element being a light-guide optical element, the second surface of the wafer and the second surface of the optical element are plane surfaces, and during the moving step, the second surface of the wafer and the second surface of the optical element move in parallel one to the other with a predetermined speed; and/or the second surface of the wafer has a predetermined shape different from the predetermined shape of the first surface of the optical element; and/or after the glue deposing step, the method further comprises a polymerizing step, during which the glue deposit spread at least on the first surface of the optical element and/or on the second surface of the wafer is polymerized.

The invention further relates to a computer program product comprising one or more stored sequences of instructions that are accessible to a processor and which, when executed by the processor, causes the processor to carry out the steps of the method for forming an optical system according to the invention.

The invention further relates to a computer readable storage medium having a program recorded thereon, where the program makes the computer execute the steps of the method for forming an optical system according to the invention.

BRIEF DESCRIPTION OF THE DRAWINGS

Other characteristics and advantages of the invention will become more apparent from the claims and from the following description of some embodiments given by way of example without limitation with reference to the drawings, in which:

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF PREFERRED EMBODIMENTS

The invention relates to a holding system for supporting a wafer and an optical element.

Figure 1:
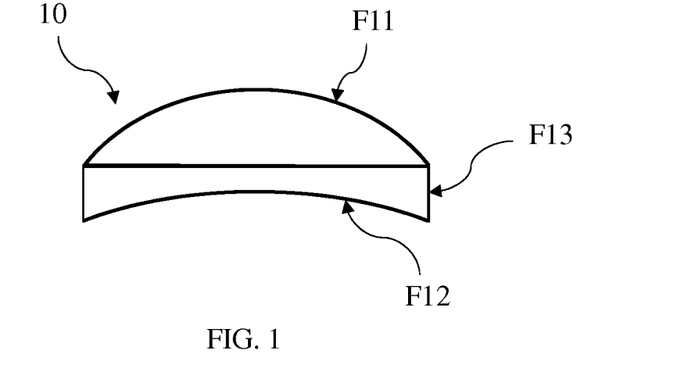
FIG. 1 represents a wafer intended to be held by the holding system according to the invention.

In particular, a wafer 10 is represented in FIG. 1. The wafer 10 has a first surface F11 and a second surface F12 opposed to the first surface F11. The wafer 10 further has a third surface F13 joining the first surface F11 and the second surface F12.

The wafer 10 is preferably made of transparent material. The first surface F11 of the wafer 10 is adapted to the prescription of a wearer. The first surface F11 of the wafer 10 may compensate an optical defect or a non-zero optical power of the optical element. The second surface F12 of the wafer may be adapted to the prescription of the wearer.

The wearer's prescription is a set of optical characteristics of optical power, of astigmatism and, where relevant, of addition, determined by an ophthalmologist in order to correct the vision defects of the wearer, for example by means of a lens positioned in front of his eye.

Although the first surface F11 of the wafer 10 is represented in FIG. 1 as convex and the second surface F12 of the wafer 10 is represented in FIG. 1 as concave, it will be appreciated that the first surface F11, respectively the second surface F12, of the wafer 10 could equally well be concave, respectively convex, or any other plane, spherical, toric, curved, progressive or complex surfaces.

The wafer 10 may be treated with a surface treatment applied on the second surface F12 of the wafer 10 and/or on the first surface F11 of the wafer 10.

The wafer 10 may be molded, in particular molded by injection, or machined so as to form the first surface F11 with the prescription of a wearer.

Figure 2:
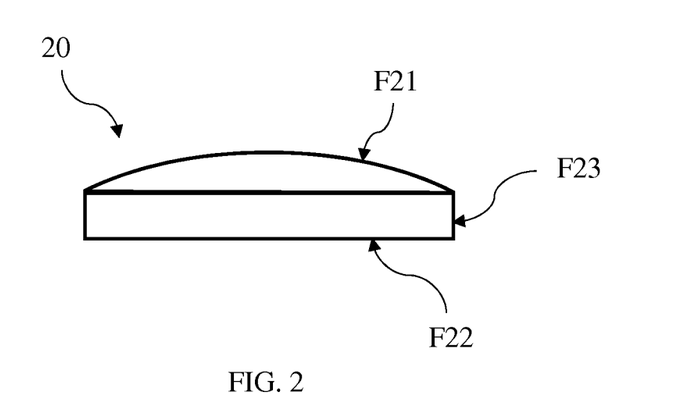
FIG. 2 represents an optical element intended to be held by the holding system according to the invention.

An optical element 20 is represented in FIG. 2. An optical element may be a light-guide optical element, an electro-chromic cell, a liquid crystal display cell, a slab made of a material different or with a different color from the transparent material of the wafer, or any optical element having two surfaces facing each other.

The optical element 20 has a first surface F21 and a second surface F22 opposed to the first surface F21. The optical element further has a third surface F23 joining the first surface F21 and the second surface F22.

The third surface F13 of the wafer 10 and the third surface F23 of the optical element 20 may be identical. Preferably, the third surface F13 of the wafer 10 and the third surface F23 of the optical element 20 are different one from the other.

The optical element 20 is preferably made of transparent material. The optical element 20 may have a non-zero optical power.

Although the first surface F21 of the optical element 20 is represented in FIG. 2 as convex and the second surface F22 of the optical element 20 is represented in FIG. 2 as plane, it will be appreciated that the first surface F21, respectively the second surface F22, of the optical element 20 could equally well be plane, respectively convex, or any other concave, spherical, toric, curved, progressive or complex surfaces. Preferably, when the optical element 20 is a light-guide optical element or an electro-chromic cell, both the first surface F21 and the second surface F22 of the optical element 20 are planes surfaces.

The optical element 20 may be treated with a surface treatment applied on the first surface F21 of the optical element 20.

The optical element 20 may be molded, in particular molded by injection, or machined.

Preferably, the second surface F12 of the wafer 10 has a predetermined shape different from the predetermined shape of the first surface F21 of the optical element 20. Of course, the second surface F12 of the wafer 10 and the first surface F21 of the optical element 20 may have the same predetermined shape.

The wafer and the optical element are conformed so as to form an optical system. In particular, the wafer 10 is intended to be glued to the optical element 20. The optical system is formed with the wafer 10, the glue and the optical element 20.

At least part of a holding system 30 according to the invention is represented in FIGS. 3 to 9.

The holding system 30 comprises support means comprising first support means 40 and second support means 50.

The first support means 40 are configured to support at least part of the second surface F12 and/or at least part of the third surface F13 of the wafer 10.

As represented in FIGS. 3, 4, 6 and 7, the first support means 40 are configured to support part of the second surface F12 of the wafer 10.

Figure 8:
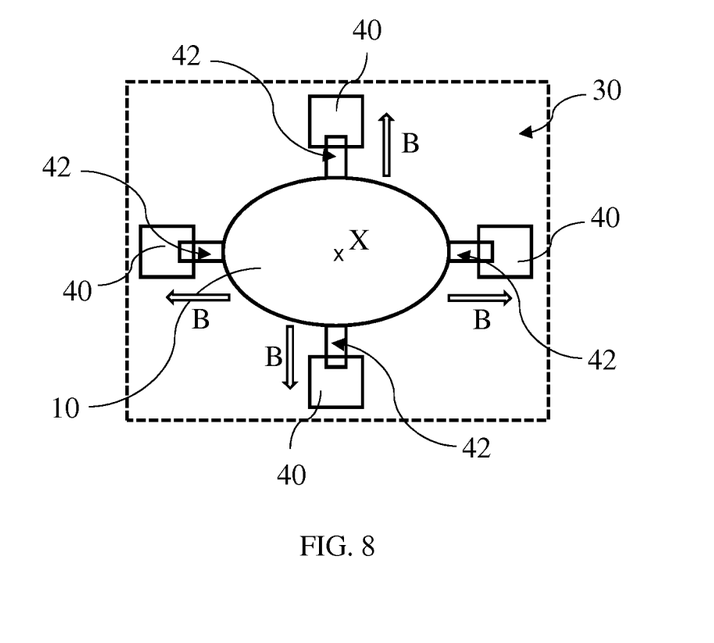
Figure 9:
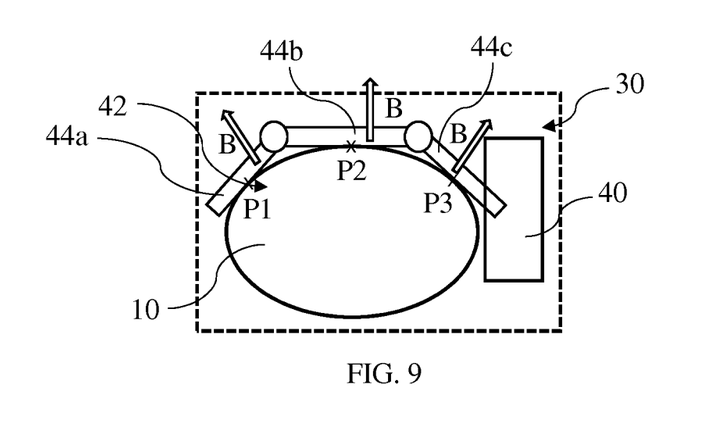

As represented in FIGS. 8 and 9, the first support means 40 are configured to support part of the third surface F13 of the wafer 10.

Advantageously, having the wafer 10 supported by its second surface F12 and/or its third surface F13 allows preserving its first surface F11 adapted to the prescription of a wearer. Indeed, the first surface F11 of the wafer 10 cannot be deformed by the first support means 40. Hence, the prescription of the wearer cannot be deformed by the first support means 40.

The second support means 50 are configured to support at least part of the second surface F22 and/or at least part of the third surface F23 of the optical element 20.

Figure 3:
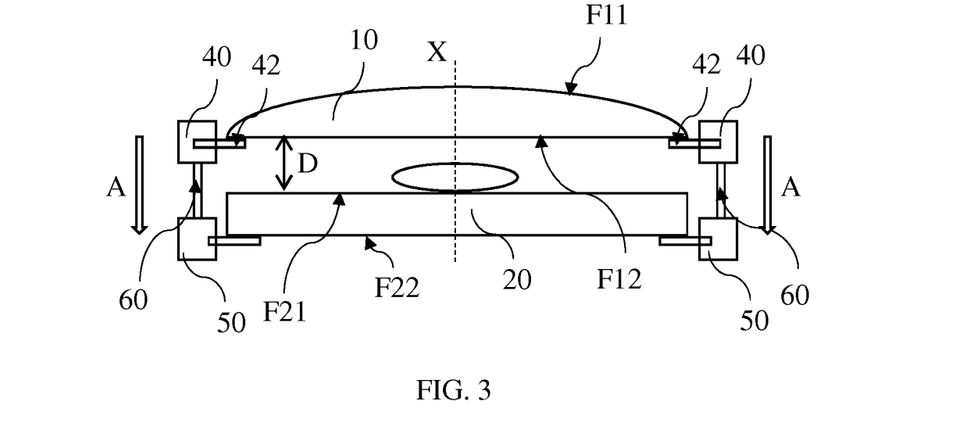
FIGS. 3 to 5 represent side views of a holding system according to the invention.
Figure 4:
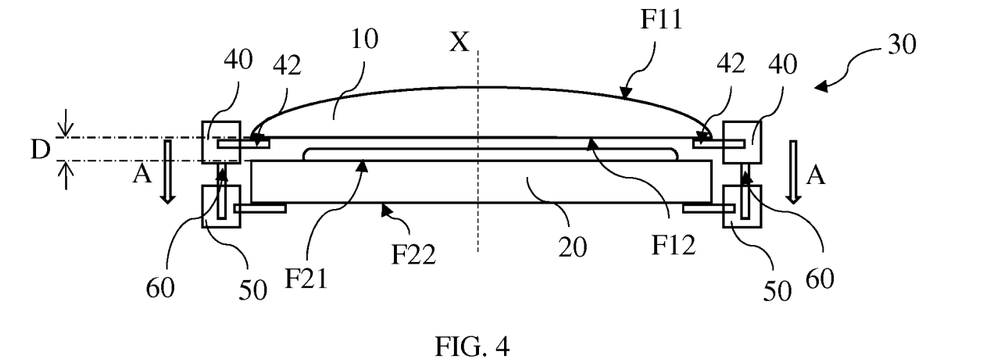
Figure 5:
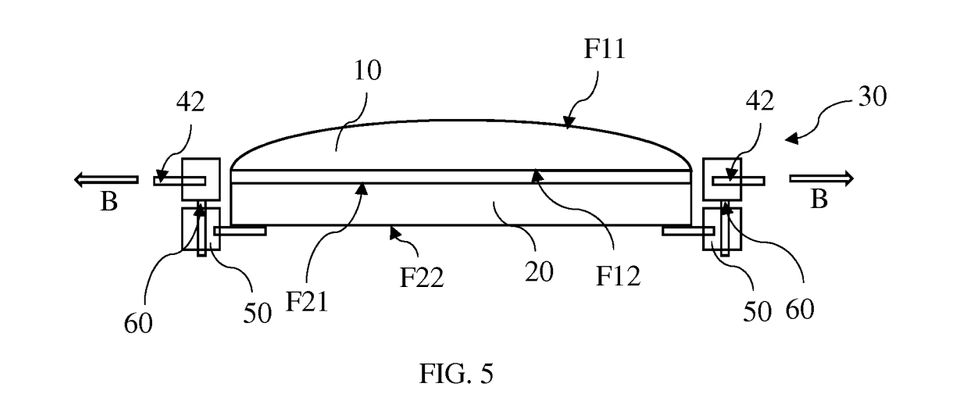

As represented in FIGS. 3 to 5, the second support means 50 are configured to support part of the second surface F22 of the optical element 20.

The holding system 30 comprises positioning means configured to position the second surface F12 of the wafer 10 relative to the first surface F21 of the optical element 20. Preferably, the support means are the positioning means. In other words, the support means and the positioning means are the same means.

The holding system 30 comprises mechanical means 60 configured to move the first support means 40 and the second support means 50 one relative to the other. The first support means 40 and the second support means 50 are moved so as to move the second surface F12 of the wafer 10 and the first surface F21 of the optical element 20 to form the optical system. Preferably, the first support means 40 are moved in the direction of the second support means 50.

Advantageously, the second surface F12 of the wafer 10 is moving toward the first surface F21 of the optical element 20 so as to form the optical system.

The arrows A represented in FIGS. 3 and 4 represent the movement of the mechanical means 60, and more precisely, the movement of the first support means 40 in the direction of the second support means 50.

The mechanical means 60 may be configured to move the first support means 40 and the second support means 50 one relative to the other so that the distance D between the second surface F12 of the wafer 10 and the second surface F22 of the optical element 20 varies constantly.

Advantageously, having the distance D between the second surface F12 of the wafer 10 and the second surface F22 of the optical element 20 varying constantly allows avoiding prism to be formed in the optical system.

In particular, for an optical element 20 being a light-guide optical element, when the second surface F12 of the wafer 10 and the second surface F22 of the optical element 20 are plane surfaces, the mechanical means 60 are configured to move the first support means 40 and the second support means 50 one relative to the other so that the second surface F12 of the wafer 10 and the second surface F22 of the optical element 20 move in parallel one to the other.

Advantageously, having the second surface F12 of the wafer 10 and the second surface F22 of the optical element 20 moving in parallel one to the other allows avoiding prism to be formed in the optical system.

For instance, two mechanical means 60 are represented in FIGS. 3 to 5. The second surface F12 of the wafer 10 and the second surface F22 of the optical element 20 are plane surfaces. In FIGS. 3 to 5, the second surface F12 of the wafer 10 and the second surface F22 of the optical element 20 are parallel one to the other. In other words, in FIGS. 3 to 5, the distance D between the second surface F12 of the wafer 10 and the second surface F22 of the optical element 20 in the direction of the axis X, the axis X being perpendicular to the plane of the second surfaces F12, F22 of the wafer 10 and of the optical element 20, is constant.

FIGS. 3 to 5 represent different steps of the movement of the mechanical means 60. For instance, the distance D between the second surface F12 of the wafer 10 and the second surface F22 of the optical element 20 in FIG. 3 is greater than the distance D between the second surface F12 of the wafer 10 and the second surface F22 of the optical element 20 in FIG. 4. Plus, the distance D between the second surface F12 of the wafer 10 and the second surface F22 of the optical element 20 in FIG. 4 is greater than the distance D between the second surface F12 of the wafer 10 and the second surface F22 of the optical element 20 in FIG. 5. Indeed, comparing FIGS. 3 to 5, the first support means 40 of FIG. 5 are closer to the second support means 50 than the first support means 40 of FIG. 3 or 4.

The mechanical means 60 may comprise translation means and/or rotation means. Preferably, the mechanical means 60 comprise translation means so that the distance D between the second surface F12 of the wafer 10 and the second surface F22 of the optical element 20 varies constantly. The translation means of the mechanical means 60 are configured to translate along the axis X.

Advantageously, the mechanical means 60 comprising translation means allows avoiding prism to be formed in the optical system.

The mechanical means 60 may be manually controlled, for example with a micrometric screw. The mechanical means 60 may be automatically controlled, for instance mechanically or electronically.

The mechanical means 60 may be configured to move the first support means 40 and the second support means 50 one relative to the other with a predetermined speed.

Advantageously, the second surface F12 of the wafer 10 is moved toward the first surface F21 of the optical element 20 so as to form the optical system.

The predetermined speed is smaller than the speed of the fall of the wafer 10, due to the gravity, without the mechanical means 60.

The predetermined speed may be relative to a material composing the wafer 10 and/or to a surface treatment applied on the second surface F12 of the wafer 10 and/or to the shape of the wafer 10 and/or to the type of the wafer 10.

The predetermined speed may be relative to a material composing the optical element 20 and/or to a surface treatment applied on the first surface F21 of the optical element 20.

Figure 6:
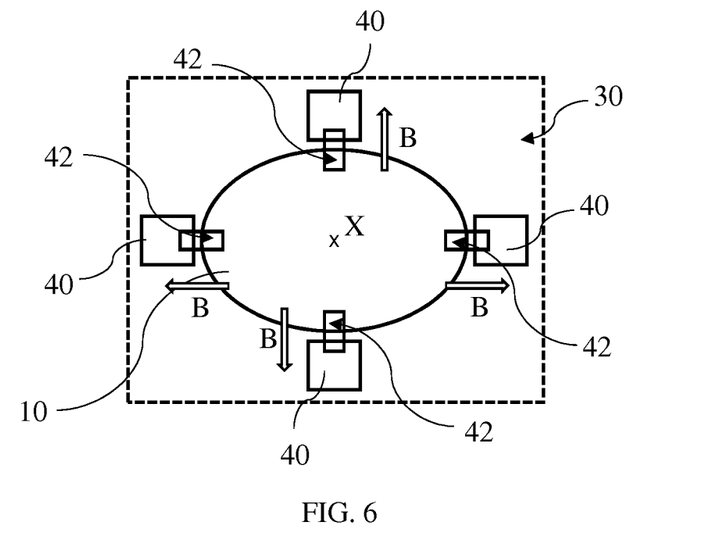
FIGS. 6 to 9 represent top views of a holding system according to to embodiments of the invention.

The first support means 40 may comprise one or a plurality of blades 42. For instance, in FIGS. 3 to 5, two blades 42 are represented. In FIGS. 6 and 8, the first support means 40 comprise four blades 42, and in FIGS. 7 and 9, the first support means 40 comprise one blade 42.

A blade 42 is configured to support at least part of the second surface F12 and/or at least part of the third surface F13 of the wafer 10.

Figure 7:
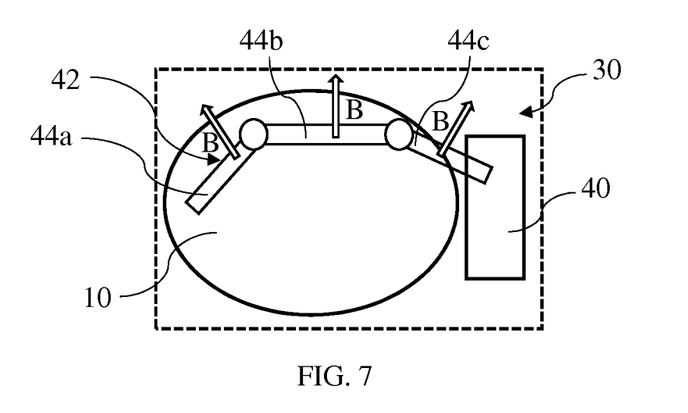

As represented in FIGS. 3, 4 and 6, the blades 42 of the first support means 40 are configured to support part of the second surface F12 of the wafer 10. In FIG. 7, the blade 42 of the first support means 40 is configured to support part of the second surface F12 of the wafer 10.

As represented in FIG. 8, the four blades 42 of the first support means 40 are configured to support part of the third surface F13 of the wafer 10. In FIG. 9, the blade 42 of the first support means 40 is configured to support part of the third surface F13 of the wafer 10.

The wafer 10, the first support means 40, the optical element 20 and the second support means 50 may be aligned in that order along the axis X as represented in FIGS. 3 and 4.

The plurality of blades 42 may be configured to be regularly distributed on the periphery of the second surface F12 of the wafer 10. In other words, the plurality of blades 42 may be configured to be regularly distributed on the periphery of the second surface F12 of the wafer 10 around the axis X, as represented in FIG. 6.

The plurality of blades 42 may be configured to be regularly distributed on the third surface F13 of the wafer 10 around the axis X, as represented in FIG. 8.

A blade 42 may be made of metallic material or of nylon. Preferably, a blade 42 is made of plastic material.

A blade 42 may be deformable so as to present a plurality of contact points with the second surface F12 and/or with the third surface F13 of the wafer 10.

The blade 42 may be made of a deformable material so as to present a plurality of contact points with the second surface F12 and/or with the third surface F13 of the wafer 10.

The blade 42 may comprise a plurality of portions 44 articulated one relative to the other so that the blade 42 is deformable. In particular, at least one portion 44 of the blade 42 may present a plurality of contact points with the second surface F12 and/or with the third surface F13 of the wafer 10.

As represented in FIGS. 7 and 9, the first support means 40 comprise one deformable blade 42 which comprises three portions 44a, 44b, 44c. The first portion 44a is articulated with the second portion 44b, and the second portion 44b is articulated with the third portion 44c. Three contact points P1, P2, P3 between the third surface F13 of the wafer 10 and the deformable blade 42 are represented in FIG. 9. In particular, each portion 44a, 44b, 44c of the deformable blade 42 present at least a contact point P1, P2, P3 with the third surface F13 of the wafer 10.

At least a part of a blade 42 may be conformed to be removed from the first support means 40. More precisely, the blade 42 may be cut so that a part of the blade 42 is removed from the first support means 40. In particular, the other part of the blade 42 may remain in the optical system.

A blade 42 may be conformed to be entirely removed from the first support means 40. In particular, a part of or the whole blade 42 may remain in the optical system.

A blade 42 may be a retractable blade. More precisely, the blade 42 may be retracted from the second surface F12 and/or from the third surface F13 of the wafer 10. In other words, in the extended position, the blade 42 is configured to support the second surface F12 and/or the third surface F13 of the wafer 10, and in the retracted position, the blade 42 does not support the second surface F12 and/or the third surface F13 of the wafer 10.

As represented in FIGS. 3 and 4, the blades 42 are in the extended position. In FIG. 5, the blades 42 are in the retracted position. As represented in FIGS. 5 to 9, the arrows B represent the movement of the retraction of the blades 42.

A blade 42 may be manually or automatically retractable.

A blade 42 may be configured to be retracted when the distance between the second surface F12 of the wafer 10 and the first surface F21 of the optical element 20 is equal to a predetermined distance.

In particular, the plurality of blades 42 may be configured to be retracted simultaneously when the distance between the second surface F12 of the wafer 10 and the first surface F21 of the optical element 20 is equal to a predetermined distance.

The holding system 30 may comprise glue deposing means. The glue deposing means are configured to drop off glue with a predetermined shape on the first surface F21 of the optical element 20. Of course, the glue deposing means may be configured to drop off glue on the whole first surface F21 of the optical element 20.

Of course, the glue deposing means may be configured to drop off glue with a predetermined shape on the second surface F12 of the wafer 10, or on the whole second surface F12 of the wafer 10.

Preferably, the glue deposing means are configured to drop off glue on both the first surface F21 of the optical element 20 and the second surface F12 of the wafer 10. Advantageously, having glue deposing means configured to drop off glue on both the first surface F21 of the optical element 20 and on the second surface F12 of the wafer 10 allows avoiding air bubbles to be formed on the optical system. For instance, the glue deposing means may be configured to drop off one bubble of glue, or a plurality of bubbles of glue, or a glue spread, for instance with the form of a bone. As represented in FIG. 3, one bubble of glue 70 is dropped off on the first surface F21 of the optical element 20.

Advantageously, having glue deposing means configured to drop off glue on the first surface F21 of the optical element 20 and/or on the second surface F12 of the wafer 10 allows gluing the second surface F12 of the wafer 10 and the first surface F21 of the optical element 20 when the first support means 40 and second support means 50 move one relative to the other.

A blade 42 may be configured to be retracted when the glue deposit spread on more than 50% of the first surface F21 of the optical element 20. Preferably, the blade 42 is configured to be retracted when the glue deposit 70 spread on a surface comprised between 50% and 80% of the first surface F21 of the optical element 20.

In particular, the plurality of blades 42 may be configured to be retracted simultaneously when the glue deposit 70 spread on more than 50%, and preferably less than 80%, of the first surface F21 of the optical element 20.

After the retraction of the blades 42, the weight of the wafer 10 allows the glue deposit 70 to continue spreading on the first surface F21 of the optical element 20 until the glue reaches the periphery of the wafer 10.

The thickness of a blade 42, namely the dimension of the blade 42 in the direction of the axis X, may be smaller than or equal to the thickness of the glue deposit 70 spreading on more than 40% of the first surface F21 of the optical element 20. Preferably, the thickness of a blade 42 is smaller than or equal to the thickness of the glue deposit 70 spreading on around 50% of the first surface F21 of the optical element 20.

The mechanical means 60 may be configured to move the first support means 40 and the second support means 50 one relative to the other with a predetermined speed, the predetermined speed being relative to a material composing the glue 70 and/or to the predetermined shape of the glue deposit 70 on the first surface F21 of the optical element 20 and/or to the spread of the glue deposit 70 on the first surface F21 of the optical element 20.

Advantageously, a low predetermined speed allows avoiding air bubbles in the glue deposit 70 between the first surface F21 of the optical element 20 and the second surface F12 of the wafer 10 when the optical system is formed, and allows avoiding prism to be formed in the optical system.

As represented in FIG. 5, the distance D between the second surface F12 of the wafer 10 and the second surface F22 of the optical element 20 is equal to the thickness of the glue deposit 70 spreading on the first surface F21 of the optical element 20.

Preferably, when the second surface F12 of the wafer 10 and the second surface F22 of the optical element 20 are plane surfaces, for instance when the optical element 20 is a light-guide optical element, the thickness of the glue deposit 70 is constant between the second surface F12 of the wafer 10 and the first surface F21 of the optical element 20.

Advantageously, having a constant thickness of glue deposit 70 on the optical system allows avoiding air bubbles in the glue deposit 70 and prism to be formed in the optical system.

The holding system 30 may comprise a real-time measuring device, for instance an optical measuring device, configured to measure in real-time the distance between the second surface F12 of the wafer 10 and the second surface F22 of the optical element 20.

In particular, for an optical element 20 being a light-guide optical element, when the second surface F12 of the wafer 10 and the second surface F22 of the optical element 20 are plane surfaces, the holding system 30 may comprise a real-time measuring device configured to measure in real-time the parallelism between the second surface F12 of the wafer 10 and the second surface F22 of the optical element 20.

The mechanical means 60 may be configured to move each blade 42 of the plurality of blades 42 independently one from the other based on the measurement of the real-time measuring device.

The holding system 30 may comprise a polymerizing device configured to polymerize the glue deposit 70 spread at least on the first surface F21 of the optical element 20. In particular, the polymerizing device may be configured to polymerize the glue deposit 70 spread on both the first surface F21 of the optical element 20 and the second surface F12 of the wafer 10. More precisely, the polymerizing device may be configured to polymerize the glue deposit 70 when the optical system is formed.

The invention further relates to a method for forming an optical system, the optical system comprising a wafer 10 and an optical element 20.

Figure 10:
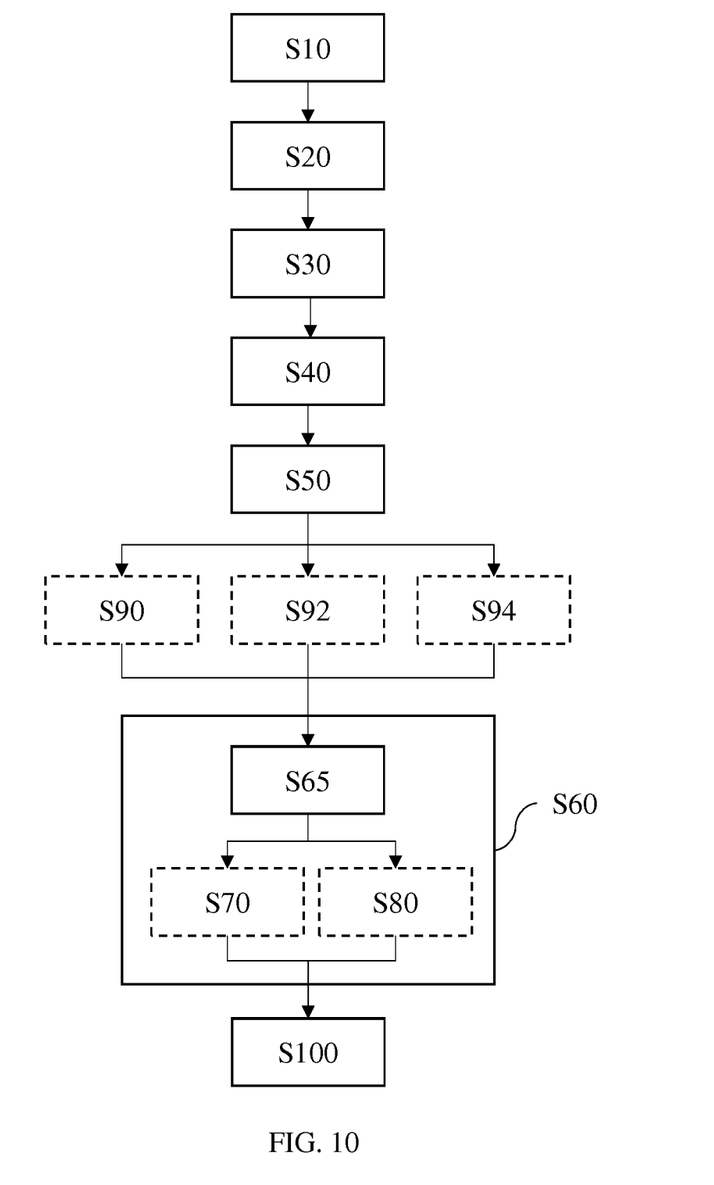
FIG. 10 is a flowchart of the different steps of a method for forming an optical system according to the invention.

FIG. 10 represents a flowchart of the different steps of the method for forming an optical system according to the invention.

The method comprises a holding system providing step S10, during which a holding system 30 according to the invention is provided.

The method comprises an optical element providing step S20, during which an optical element 20 as described previously is provided.

The method comprises a wafer providing step S30, during which a wafer 10 as described previously is provided.

In particular, the holding system providing step S10, the optical element providing step S20 and the wafer providing step S30 may be carried out in any order.

After the optical element providing step S20, the method comprises an optical system positioning step S40, during which the second surface F22 and/or the third surface F23 of the optical system 20 is positioned on the second support means 50 of the holding system 30. During the optical system positioning step S40, the second surface F22 of the optical element 20 may be positioned on the second support means 50 according to a reference system.

After the wafer providing step S30, the method comprises a wafer positioning step S50, during which the second surface F12 and/or the third surface F13 of the wafer 10 is positioned on the first support means 40 of the holding system 30. During the wafer positioning step S50, the first surface F11 of the wafer 10 may be positioned on the first support means 40 according to the second surface F22 of the optical element 20.

After the optical system positioning step S40 and the wafer positioning step S50, the method comprises a moving step S60, during which the first support means 40 and the second support means 50 are moved one relative to the other. In particular, the second surface F12 of the wafer 10 and the first surface F21 of the optical element 20 are moved so as to form the optical system.

During the moving step S60, the method may further comprise a positioning step S65, during which the second surface F12 of the wafer 10 is positioned relative to the first surface F21 of the optical element 20. More precisely, the second surface F12 of the wafer 10 may be centered on the first surface F21 of the optical element 20.

In particular, a pre-positioning of the second surface F12 of the wafer 10 relative to the first surface F21 of the optical element 20 may be first realized. And then, after the glue deposing step S90, S92, S94 and previous to the polymerizing step S100, the positioning step S65 allows obtaining the final positioning of the second surface F12 of the wafer 10 relative to the first surface F21 of the optical element 20.

The positioning, and more particularly the centering of the second surface F12 of the wafer 10 relative to the first surface F21 of the optical element 20 may be realized with optical centering.

During the moving step S60, the method may further comprise a blade retracting step S70, during which the blade 42 is retracted. In other words, the blade 42 remains in the first support means 40.

During the moving step S60, the method may further comprise a blade removing step S80, during which at least a part of the blade 42 is removed from the first support means 40.

During the blade removing step S80, the part of the blade 42 may be cut from the first support means 40. In other words, a part of the blade 42 remains in the first support means 40, and the other part of the blade remains in the optical system.

During the blade removing step S80, the blade 42 may be entirely removed from the first support means 40. In other words, the blade 42 remains in the optical system.

The optical system may be intended to be integrated in a frame. The part of the blade 42 which remain on the optical system may be arranged to be covered by the frame.

After the optical element providing step S20, the method may further comprise a glue deposing step S90, during which glue is dropped off on the first surface F21 of the optical element 20.

Alternatively, after the wafer providing step S30, the method may further comprise a glue deposing step S92, during which glue is dropped off on the second surface F12 of the wafer 10.

Alternatively, after the optical element providing step S20 and the wafer providing step S30, the method may further comprise a glue deposing step S94, during which glue is dropped off on the first surface F21 of the optical element 20 and on the second surface F12 of the wafer 10.

The glue deposing step S90, S92, S94 may be carried out during the moving step S60. Preferably, the glue deposing step S90, S92, S94 are carried out before the moving step S60.

During the moving step S60, the second surface F12 of the wafer 10 and the first surface F21 of the optical element 20 may be glued one with the other so as to form the optical system.

During the blade retracting step S70, the blade 42 may be retracted when the glue deposit spread on more than 50%, and preferably less than 80%, of the first surface F21 of the optical element 20.

During the moving step S60, the distance between the second surface of the wafer and the second surface of the optical element varies constantly.

During the moving step S60, the second surface F12 of the wafer 10 and the second surface F22 of the optical element 20 may move one relative to the other with a predetermined speed.

When the second surface F12 of the wafer 10 and the second surface F22 of the optical element 20 are plane surfaces, for instance when the optical element 20 is a light-guide optical element, the second surface F12 of the wafer 10 and the second surface F22 of the optical element 20 may move in parallel one to the other with a predetermined speed.

After the glue deposing step S90, S92, S94, the method may further comprise a polymerizing step S100, during which the glue deposit spread on the first surface F21 of the optical element 20 and/or on the second surface F12 of the wafer 10 is polymerized.

In particular, the polymerizing step S100 may be carried out after the moving step S60.

The invention has been described above with the aid of embodiments without limitation of the general inventive concept. Moreover, the embodiments of the invention may be combined without any restriction.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A holding system for supporting a wafer and an optical element, the wafer and the optical element being conformed to form an optical system, the wafer having a first surface adapted to a prescription of a wearer, a second surface opposed to the first surface, and a third surface joining the first surface and the second surface, the optical element having a first surface, a second surface opposed to the first surface, and a third surface joining the first surface and the second surface, the holding system comprising:
a support and positioning system configured to position the second surface of the wafer relative to the first surface of the optical element, the support and positioning system comprising
a first support configured to support at least part of one or more of: (i) the second surface and (ii) the third surface of the wafer, the first support comprising a plurality of blades, each of the blades being configured to support at least part of one or more of: (i) the second surface and (ii) the third surface of the wafer, and
a second support configured to support at least part of one or more of: (i) the second surface and (ii) the third surface of the optical element;
a mechanical system configured to move the first support and the second support one relative to the other to move the second surface of the wafer and the first surface of the optical element to form the optical system; and
a real-time measuring device configured to measure in real-time the distance between the second surface of the wafer and the second surface of the optical element,
wherein the mechanical system is configured to move each of the blades independently from each other based on the measured distance.

2. The holding system according to claim 1, wherein at least one of the plurality of blades is a retractable blade.

3. The holding system according to claim 2, further comprising a glue deposing system configured to drop off glue with a predetermined shape on one or more of: (i) the first surface of the optical element and (ii) the second surface of the wafer.

4. The holding system according to claim 2, wherein the mechanical system is configured to move the first and second supports one relative to the other with a predetermined speed.

5. The holding system according to claim 1, further comprising a glue deposing system configured to drop off glue with a predetermined shape on one or more of: (i) the first surface of the optical element and (ii) the second surface of the wafer.

6. The holding system according to claim 4, further comprising a polymerizing device configured to polymerize the glue deposit spread at least on one or more of: (i) the first surface of the optical element and (ii) the second surface of the wafer.

7. The holding system according to claim 5, wherein the mechanical system is configured to move the first and second supports one relative to the other with a predetermined speed.

8. The holding system according to claim 1, wherein the mechanical system is configured to move the first and second supports one relative to the other with a predetermined speed.

9. The holding system according to claim 5, wherein the predetermined speed is relative to one or more of:
   (i) a material composing the optical element,
   (ii) a material composing the wafer,
   (iii) a material composing the glue,
   (iv) a surface treatment applied on the first surface of the optical element,
   (v) a surface treatment applied on the second surface of the wafer,
   (vi) the shape of the wafer,
   (vii) the type of the wafer,
   (viii) the predetermined shape of the glue deposit on the first surface of the optical element,
   (ix) the predetermined shape of the glue deposit on the second surface of the wafer, and
   (x) the spread of the glue deposit on the first surface of the optical element.

10. The holding system according to claim 1, wherein the mechanical system comprises one or more of: (i) a translation system and (ii) a rotation system.

11. The holding system according to claim 1, wherein the mechanical system is configured to move the first and second supports one relative to the other so that the distance between the second surface of the wafer and the second surface of the optical element varies constantly.

12. A method for forming an optical system, the method comprising:
   providing the holding system according to claim 1;
   providing the optical element having the first surface, the second surface opposed to the first surface, and the third surface joining the first surface and the second surface;
   providing the wafer having the first surface adapted to the prescription of the wearer, the second surface opposed to the first surface, and the third surface joining the first surface and the second surface;
   positioning one or more of: (i) the second surface and (ii) the third surface of the optical system on the second support of the holding system;
   positioning one or more of: (i) the second surface and (ii) the third surface of the wafer on the first support of the holding system;
   moving the first and second supports one relative to the other to move the second surface of the wafer and the first surface of the optical element to form the optical system.

13. The method according to claim 12, wherein at least one of the blades is retractable and configured to support at least part of one or more of: (i) the second surface and (ii) the third surface of the wafer, and
   the method further comprises retracting the at least one retractable blade.

14. The method according to claim 12, further comprising:
   dropping off glue on one or more of: (i) the first surface of the optical element and (ii) the second surface of the wafer, and
   during the moving, gluing the second surface of the wafer and the first surface of the optical element one with the other to form the optical system.

15. The method according to claim 12, wherein, during the moving, moving the second surface of the wafer and the first surface of the optical element one relative to the other with a predetermined speed.

16. The method according to claim 12, wherein the second surface of the wafer has a predetermined shape different from the predetermined shape of the first surface of the optical element.

* * * * *